(12) United States Patent  
Breitfuss

(10) Patent No.: US 8,284,823 B2
(45) Date of Patent: Oct. 9, 2012

(54) SERIAL DATA COMMUNICATION SYSTEM AND METHOD

(75) Inventor: Klemens Breitfuss, Voitsberg (AT)

(73) Assignee: NXP B.V., Eindhoven (NL)

( * ) Notice: Subject to any disclaimer, the term of this patent is extended or adjusted under 35 U.S.C. 154(b) by 1041 days.

(21) Appl. No.: 12/159,966

(22) PCT Filed: Dec. 14, 2006

(86) PCT No.: PCT/IB2006/054845

§ 371 (c)(1),
(2), (4) Date: Jul. 2, 2008

(87) PCT Pub. No.: WO2007/077501

PCT Pub. Date: Jul. 12, 2007

(65) Prior Publication Data

US 2009/0010371 A1 Jan. 8, 2009

(30) Foreign Application Priority Data

Jan. 3, 2006 (EP) .................................. 06100035

(51) Int. Cl.
*H04B 1/38* (2006.01)

(52) U.S. Cl. ...................................................... 375/219

(58) Field of Classification Search ................. 375/219, 375/220, 222
See application file for complete search history.

(56) References Cited

U.S. PATENT DOCUMENTS

| 3,273,033 | A | 9/1966 | Rossmeisl |
| 4,292,595 | A | 9/1981 | Smith |
| 4,748,419 | A | 5/1988 | Somerville |
| 5,138,436 | A | 8/1992 | Koepf |
| 5,187,636 | A | 2/1993 | Nakao |
| 5,187,637 | A | 2/1993 | Embree |
| 5,321,597 | A | 6/1994 | Alacoque |
| 6,271,131 | B1 | 8/2001 | Uhlenbrock et al. |
| 6,331,999 | B1 * | 12/2001 | Ducaroir et al. ............... 375/226 |
| 6,347,395 | B1 | 2/2002 | Payne et al. |
| 6,429,735 | B1 | 8/2002 | Kuo et al. |
| 6,507,226 | B2 | 1/2003 | Swonger et al. |
| 6,636,166 | B2 | 10/2003 | Sessions et al. |
| 6,664,859 | B1 | 12/2003 | Chen et al. |
| 161,068 | A1 | 8/2004 | Zerbe et al. |
| 6,809,569 | B2 * | 10/2004 | Wang et al. ................... 327/175 |
| 6,839,862 | B2 | 1/2005 | Evoy et al. |
| 6,859,883 | B2 | 2/2005 | Svestka et al. |

(Continued)

FOREIGN PATENT DOCUMENTS

EP 1291918 12/2003

(Continued)

OTHER PUBLICATIONS

Greg Smith, "Hybrid Isolation Amps Zap Price and Voltage Barriers" Electronic Design, Dec. 11, 1986, pp. 91-?.

(Continued)

*Primary Examiner* — Don N Vo

(57) ABSTRACT

A serial data communication system (10) comprises—a local clock generation device (12) adapted for generating a clock signal (16) with a duty cycle depending on a control signal (18), and—a serial data communication control device (14) adapted for generating the control signal (18) depending on the receipt of a serial data signal and for deriving a transmit and receive clock signal (20, 21) from the clock signal (16) received from the local clock generation device (12).

10 Claims, 2 Drawing Sheets

U.S. PATENT DOCUMENTS

| | | | |
|---|---|---|---|
| 6,882,046 | B2 | 4/2005 | Davenport et al. |
| 6,920,576 | B2 | 7/2005 | Ehmann |
| 7,199,617 | B1 | 4/2007 | Schrom et al. |
| 7,302,247 | B2 | 11/2007 | Dupuis |
| 7,376,212 | B2 | 5/2008 | Dupuis |
| 7,400,173 | B1 | 7/2008 | Kwang et al. |
| 7,411,421 | B1 | 8/2008 | Steinke et al. |
| 7,421,028 | B2 | 9/2008 | Dupuis |
| 7,447,492 | B2 | 11/2008 | Dupuis |
| 7,460,604 | B2 | 12/2008 | Dupuis |
| 7,577,223 | B2 | 8/2009 | Alfano et al. |
| 7,650,130 | B2 | 1/2010 | Dupuis |
| 7,737,871 | B2 | 6/2010 | Leung et al. |
| 7,738,568 | B2 | 6/2010 | Alfano et al. |
| 7,755,400 | B2 | 7/2010 | Jordanger et al. |
| 7,821,428 | B2 | 10/2010 | Leung et al. |
| 7,856,219 | B2 | 12/2010 | Dupuis |
| 7,902,627 | B2 | 3/2011 | Dong et al. |
| 8,049,573 | B2 | 11/2011 | Alfano et al. |
| 8,064,872 | B2 | 11/2011 | Dupuis |
| 8,169,108 | B2 | 5/2012 | Dupuis et al. |
| 2001/0052623 | A1 | 12/2001 | Kameyama et al. |
| 2002/0021144 | A1 | 2/2002 | Morgan et al. |
| 2002/0184544 | A1 | 12/2002 | Svestka et al. |
| 2002/0186058 | A1 | 12/2002 | Prodanov |
| 2003/0214346 | A1 | 11/2003 | Pelliconi |
| 2004/0076192 | A1* | 4/2004 | Zerbe et al. ............. 370/516 |
| 2004/0159893 | A1 | 8/2004 | Kitahara |
| 2005/0127452 | A1 | 6/2005 | Rippke et al. |
| 2005/0174156 | A1* | 8/2005 | Wu et al. ............. 327/175 |
| 2006/0138595 | A1 | 6/2006 | Kiyotoshi |
| 2007/0075784 | A1 | 4/2007 | Pettersson et al. |
| 2008/0174360 | A1 | 7/2008 | Hsu |
| 2008/0290444 | A1 | 11/2008 | Crawley et al. |
| 2009/0146760 | A1 | 6/2009 | Reefman et al. |
| 2009/0213914 | A1 | 8/2009 | Dong et al. |
| 2009/0237858 | A1 | 9/2009 | Steeneken et al. |
| 2010/0052826 | A1 | 3/2010 | Callahan et al. |
| 2010/0118918 | A1 | 5/2010 | Dupuis |
| 2010/0327940 | A1 | 12/2010 | Eisenstadt et al. |
| 2011/0006814 | A1 | 1/2011 | Acar et al. |

FOREIGN PATENT DOCUMENTS

| | | |
|---|---|---|
| EP | 1564884 | 8/2005 |
| GB | 2204467 A | 11/1988 |

OTHER PUBLICATIONS

Wally Meinel, et al., "Hermetic Analog Isolation Amplifier", Proceedings of the 1987 International Symposium on Microelectronics, Minneapolis, Sep. 1987.

Burr Brown, Noise Sources in Applications Using Capacitive Coupled Isolated Amplifiers, Application Bulletin, Burr Brown Corporation, 1993.

Burr Brown, Hybrid Isolation Amps Zap Price and Voltage Barriers, Application Bulletin, Burr Brown Corporation, 1994.

Burr Brown, An error analysis of the ISO102 in a small signal measuring application, Application Bulletin, Burr Brown Corporation, 1994.

Burr Brown, ISO 102, ISO 106 Signal Isolation Buffer Amplifiers, Datasheet, Burr Brown Corporation, 1995.

J. Basilio Simoes, et al., "The Optical Coupling of Analog Signals" IEEE Transaction on Nuclear Science, vol. 43, No. 3, Jun. 1996, pp. 1672-1674.

Stephen L. Diamond, "IEEE 1394: Status and growth path", IEEE Micro, Jun. 1996, pp. 75-78.

Thaddeus J. Gabara, et al., "Capacitive coupling and quantized feedback applied to conventional CMOS technology" IEEE Journal of Solid-State Circuits, vol. 32, No. 3, Mar. 1997.

Adrian Paskins, "The IEEE 1394 BUS", The Institution of Electrical Engineers Conference, May 12, 1997.

Richard Crisp, "Direct Rambus Technology: The New Main Memory Standard" IEEE Micro, Nov./Dec. 1997, pp. 18-28.

Thomas Nilsson, "A distributed combined heat and power plant control unit", Master Thesis, Linköping Institute of Technology, Dec. 16, 1997.

Scott Wayne, "Finding the Needle in a Haystack: Measuring Small differential voltages in the presence of large-common mode voltages", Analog Dialogue, 34-1, 2000, pp. 1-4.

Infineon Technologies, IVAX Integrated Voice & ADSL Transceiver, PEB35512, PEB55508, PEB3558, PEB4565, PEB4566, Datasheet, Infineon Technologies AG, 2001.

William B. Kuhn, et al., "An RF-based IEEE 1394 Ground Isolator designed in silicon-on-insulator process" Circuits and Systems, 2001. MWSCAS 2001. Proceedings of the 44th IEEE 2001 Midwest Symposium on ,vol. 2 , Aug. 14-17, 2001.

Scott Irwin, XILINX, "Usage Models for multi-gigabit serial transceivers", WP157, V.1.0, Mar. 15, 2002.

phyCORE-MCF548x Hardware Manual, PHYTEC Technology Holding Company, Jan. 2005.

LANTRONIX, Xpress-DR+Wireless, Datasheet, LANTRONIX, 2006.

Eugenio Culurciello, et al., "Capacitive inter-chip data and power transfer for 3-D VLSI" IEEE Trans. Circuits Syst. II, vol. 53, No. 12, pp. 1348-1352, 2006.

Geoffrey Marcus, et al., "A Monolithic Isolation Amplifier in silicon-on-isolator CMOS: Testing and Applications", Analog Integr. Circ. Sig. Process, Jun. 27, 2006.

Inoue, A., et al "A high efficiency, high voltage, balanced cascode FET", IEEE International Microwave Symposium, Jun. 1995.

S. M. Sze, "Semiconductor Devices Physics and Technology", 2nd Edition, John Wiley and Sons, Inc., pp. 493-494 and 503-507, 1985, 2002.

Burr Brown, ISO 103, Low Cost, Internally Powered Isolation Amplifier, IC Publication Datasheet, Burr Brown Corporation, 1989.

Stephen Mick, et al., "Packaging Technology for AC Coupled Interconnection", IEEE Flip-Chip Conference, 2002.

* cited by examiner

SERIAL DATA COMMUNICATION SYSTEM AND METHOD

FIELD OF THE INVENTION

The invention relates to serial data communication, particularly to asynchronous serial data communication.

BACKGROUND OF THE INVENTION

An essential cost factor in serial data communication systems is the number of pins required for transmitting and receiving clock signals. Another important cost criterion is the clock frequency on the communication connections between devices of a serial data communication system since the clock frequency determines the power consumption of the system.

Serial data communication systems with several devices often use a local clock generator or a high frequency clock signal from which required communication clocks are derived. However, if several different communication clocks for transmitting and receiving of data are required, the high frequency clock signal must have a frequency which is many times the number of the highest communication clock in order to allow to derive different communication clocks. Typically, the frequency must be 20 to 40 times higher than the highest communication clock. For example, for a communication clock of 5 MBaud, a high frequency clock signal with a frequency from 100 to 200 MHz is required. Such high frequencies must be guided over pins which generates a significant amount of power consumption.

It is also possible to provide a single device as a local clock generator for generating different communication clock signals for transmitting and receiving data. The communication clock signals may be guided to data communication devices which use it for serially transmitting and receiving signals from other data communication devices. However, this requires at least three connection lines from the local clock generator to the devices for guiding a transmit clock signal, a receive clock signal, and a control signal for controlling the communication. Therefore, the wiring is complex.

OBJECT AND SUMMARY OF THE INVENTION

It is an object of the invention to provide a serial data communication system and method which require a less complex wiring than the before discussed solution.

In order to achieve the object defined above, with a serial data communication system according to the invention characteristic features are provided so that a serial data communication system according to the invention can be characterized in the way defined below, that is:

a local clock generation device adapted for generating a clock signal with a duty cycle depending on a control signal, and a serial data communication control device adapted for generating the control signal depending on the receipt of a serial data signal and for deriving a transmit and receive clock signal from the clock signal received from the local clock generation device.

In order to achieve the object defined above, with a method for serial data communication according to the invention characteristic features are provided so that a serial data communication method according to the invention can be characterized in the way defined below, that is:

a local clock generation device generates a clock signal with a duty cycle depending on a control signal, and a serial data communication control device generates the control signal depending on the receipt of a serial data signal and derives a transmit and receive clock signal from the clock signal received from the local clock generation device.

The characteristic features according to the invention provide the advantage that only a single clock line between the local clock generation device and the serial data communication controller is required for transmitting the clock signal. Thus, the wiring between these two devices is less complex. Furthermore, no high frequency clock signal must be guided over a pin or a pad in case of an integrated circuit which increases the power consumption of the system since the serial data communication controller may control the generation of the required clock signal by the local clock generation device.

The local clock generation device may be adapted to generate the clock signal with a predefined clock having a first duty cycle if the control signal comprises a first state and having a second duty cycle differing from the first duty cycle if the control signal comprises a second state. For example, the control signal may be a logical signal comprising the two states logical 0 and logical 1 for controlling the clock generation.

For a reliable operation, the serial data communication control device may be adapted to derive the transmit and receive clock signal from the clock signal received from the local clock generation device after the serial data signal was received for a predefined time. The predefined time serves as a filter for filtering interference signals contained in the received data signal. Since interference signals are usually very short, i.e., much shorter than the predefined time, they cannot influence the derivation of the receive and transmit clock signal.

In a preferred embodiment of the invention, the serial data communication control device is adapted to generate a pulse of the receive clock signal triggered by the negative edge of a pulse of the clock signal when the control signal comprises a respective state.

In a preferred embodiment of the invention, the system is adapted to transmit and receive data serially according to the RS232 standard.

According to a further aspect, the invention relates to a local clock generation device for use with a system according to the invention, wherein the local clock generation device comprises an oscillator for generating a local high frequency clock signal, and a clock generation circuit adapted for generating a clock signal from the local high frequency clock signal with a duty cycle depending on a control signal. This device may be implemented for example as a separate device or in an integrated circuit comprising a serial data communication system according to the invention.

According to a yet further aspect, the invention relates to a serial data communication control device for use with a system or device according to the invention, wherein the serial data communication device comprises a transmit and receive clock generation circuit adapted to generate a control signal from a receive data signal for controlling the generation of a clock signal, and data processing circuitry for processing data received from a serial data communication device and data to be transmitted to a serial data communication device.

In a preferred embodiment, the transmit and receive clock generation circuit comprises a control signal generation circuit with a multiplexer, which receives a receive data signal and a constant signal on its input side, and a multiplexer control circuitry comprising a counter and being adapted for switching either of the input signals of the multiplexer to the multiplexer output as the control signal depending on the count of the counter.

BRIEF DESCRIPTION OF THE DRAWINGS

The aspects defined above and further aspects of the invention are apparent from the exemplary embodiments to be described hereinafter and are explained with reference to these exemplary embodiments.

The invention will be described in more detail hereinafter with reference to an exemplary embodiment. However, the invention is not limited to this exemplary embodiment.

DESCRIPTION OF EMBODIMENTS

Figure 1:
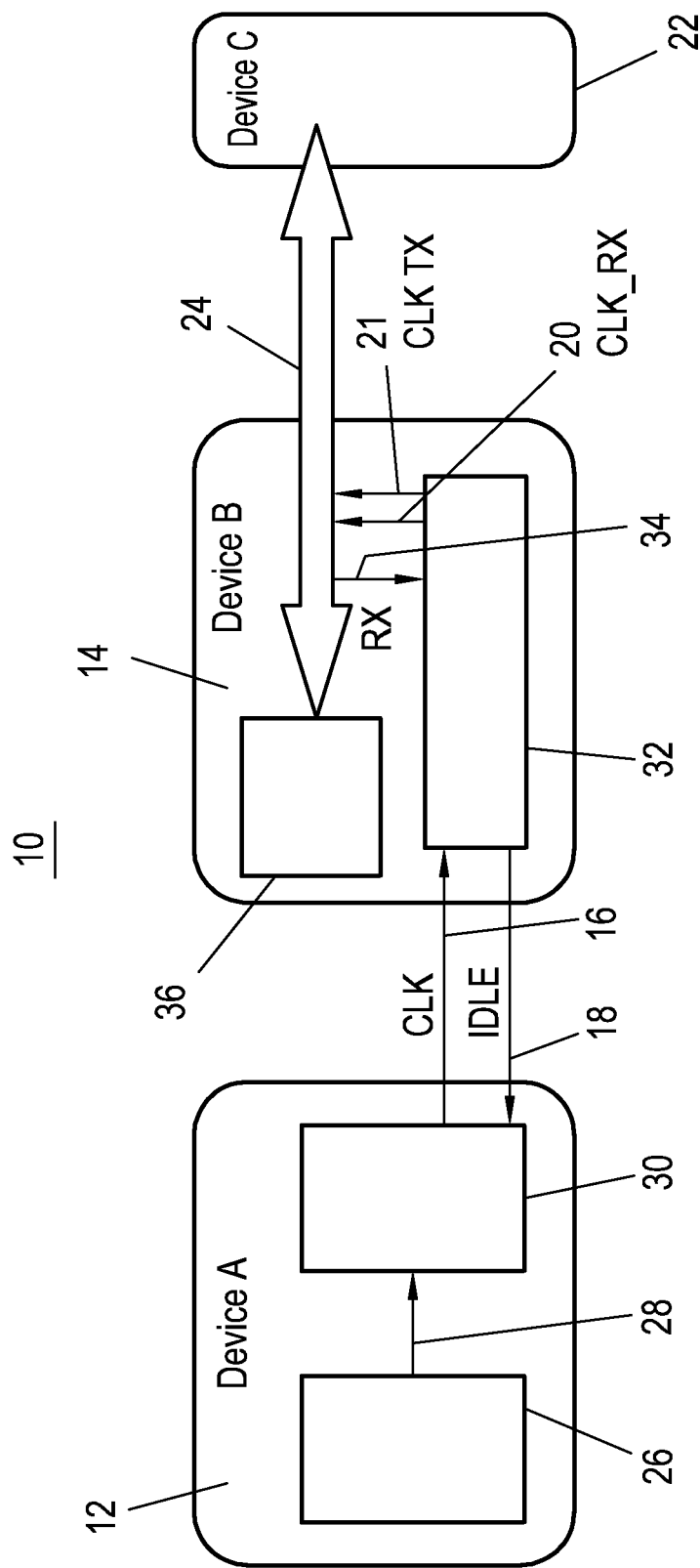
FIG. 1 shows a schematic block circuit diagram of a serial data communication system according to the invention.

FIG. 1 shows a schematic block circuit diagram of a serial data communication system 10 comprising a local clock generation device 12—in FIG. 1 also denoted as device A—and a serial data communication control device 14—in FIG. 1 also denoted as device B. Device B 14, for example implemented by an asynchronous microprocessor, communicates with a further device C 22, for example a Personal Computer PC, over a serial communication link 24. Device B 14 and device C 22 may serially transmit and receive data with a high data rate over the serial communication link 24 which may be for example based on a RS232 standard. However, it should be noted that the present invention is not restricted to a RS232 based serial communication link but may be applied to all asynchronous serial communication links for which no individual clock line is specified.

The local clock generation device 14 may be for example a NFC device having a 13.56 MHz quartz oscillator 26 for generating a local high frequency clock signal 28 which is highly accurate and stable. The local high frequency clock signal 28 is supplied to a clock generation circuit 30 which generates a clock signal CLK 16 with a duty cycle depending on the state of a control signal IDLE 18 received from the serial data communication control device 14. The clock signal CLK 16 is used in the serial data communication control device 14 for deriving a receive clock signal CLK_RX 20 for sampling data contained in a serial data signal received from device C 22. Furthermore, the clock signal CLK 16 is used in the serial data communication control device 14 as a basis for generating a transmit clock signal CLK_TX 21.

The serial data communication control device 14 comprises a transmit and receive clock generation circuit 32 which is designed to generate the control signal IDLE 18 from a receive data signal RX 34 as will be explained later in detail. Furthermore, the transmit and receive clock generation circuit 32 is designed to generate the receive clock signal CLK_RX 20 and the transmit clock signal CLK_TX 21, by deriving both clock signals 20 and 21 from the clock signal CLK 16. Device B 14 also comprises data processing circuitry 36 for processing data received from device C and data to be transmitted to device C 22.

Figure 2:
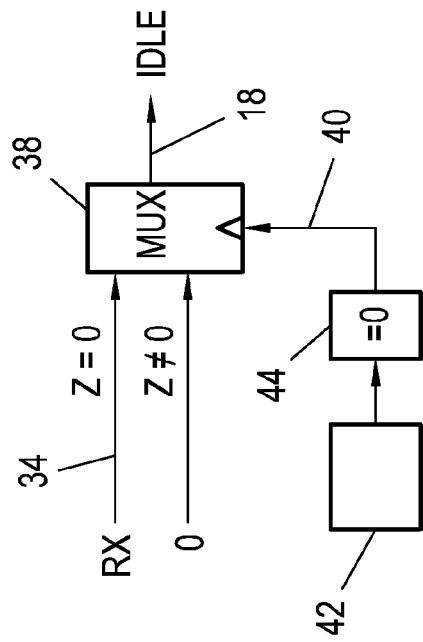
FIG. 2 shows an embodiment of a circuitry for generating a control signal for controlling the duty cycle of the clock signal generated by the local clock generation device according to the invention.

FIG. 2 shows a circuitry for generating the control signal IDLE 18 from the receive data signal RX 34. The circuitry comprises a multiplexer 38 which receives on its input side the receive data signal RX 34 and a logical 0. The multiplexer 38 switches one of its inputs on its output depending on a multiplexer control signal 40, which is generated by a counter 42 and a comparator 44. The comparator 44 compares the count of the counter 42 with 0. If the count is equal to 0, the comparator 44 generates the multiplexer control signal 40 such that the receive data signal RX 34 is switched on the multiplexer output. Then, the control signal IDLE 18 is the receive data signal RX 34. If the comparison is not equal to 0, the comparator 44 generates the multiplexer control signal 40 such that the logical 0 is switched on the multiplexer output. Then, the control signal IDLE 18 is logical 0.

Figure 3:
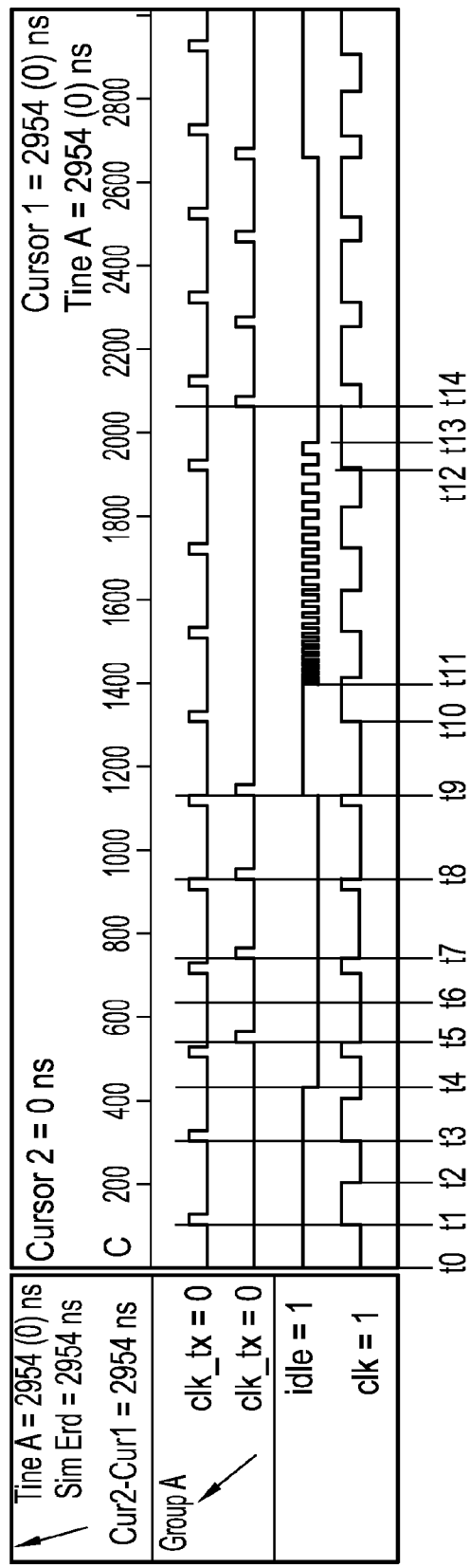
FIG. 3 shows a timing diagram with different signals generated in the data communication system of FIG. 1.

FIG. 3 shows in a timing diagram the course of signals of the serial data communication system 10. In the following, the function of the system 10 shown in FIG. 1 is explained in detail with regard to the signal courses shown in FIG. 3. The timing diagram shows the clock signal CLK, the transmit clock signal CLK_TX, the receive clock signal CLK_RX, and the control signal IDLE for controlling the clock signal CLK generated by the local clock generation device 12. The courses of the signals correspond to the RS232 standard protocol.

For the serial communication between the device B 14 and C 22, the following declarations must be met by the communicating devices 14 and 22:

a) both devices transmit serial data with the same frequency, i.e., the transmit clock signal CLK_TX of one device must be equal to the receive clock signal CLK_RX of the other device;

b) a serial communication between the devices is initiated by a initialization signal such as a start bit which signals to the receiving device that serial data will be sent from the transmitting device to the receiving device;

c) after the initialization signal, a predefined number of data bits, for example eight or two are sent, and after the predefined number of data bits, a stop bit signals the end of the serial data transmission.

In the diagram of FIG. 3, the serial transmission of two data streams each comprising four bits (one start, two data and one stop bit) are shown. The start bit is a logical 0 and the stop bit a logical 1 according to the RS232 standard. The timing diagram starts at time t0. In the device B 14, the receive data signal RX 34 is logical 1 since no data are transmitted from device C 22 to device B 14. The receive data signal RX 34 is switched by the multiplexer 38 to the control signal IDLE 18 (see FIG. 2). The local clock generation device 12 generates a clock signal CLK 16 with a predefined duty cycle of about 50%. The clock frequency of the clock signal CLK 16 is defined by the bit length of time t3 minus time t1 with a duty cycle of time t2 minus time t1. Each positive edge of the clock signal CLK 16 triggers the transmit and receive clock generation circuit 32 to generate a pulse of the transmit clock signal CLK_TX 21 at times t1, t3, etc. As long as no serial data are received, the transmit and receive clock generation circuit 32 outputs a logical 0 as the receive clock signal CLK_RX 20.

At time t4, device B 14 receives a signal from device C 22 which may be a start bit of a serial data transmission. On receipt of the signal, the control signal IDLE 18 is switched from logical 1 to logical 0 by the transmit and receive clock generation circuit 32. The clock generation device 12 waits for a certain time period and checks after this time period whether the control signal IDLE 18 is still logical 0 (at time t5). The certain time period corresponds to a bit length required to interpret the received signal as a start bit of a serial data transmission. It should be understood that the certain time period may be longer or shorter than the half of a bit length. However, it should be longer than the time length of typical interference signals contained in the received signal from device C 22, as will be explained later in detail.

After the certain time period, the local clock generation device A 12 interprets the control signal IDLE 18 as a start bit for receiving serial data and generates a negative edge of the clock signal CLK 16 (assuming that the clock signal CLK 16 is at time t5 logical 1). This negative edge triggers the transmit and receive clock generation circuit 32 to generate a sampling pulse of the receive clock signal CLK_RX for sampling the received serial data RX. At the same time, the transmit and receive clock generation circuit 32 starts the counter 42 (see FIG. 2) to count down for the time period of the predefined data bits of a serial transmission. In the timing diagram shown in FIG. 3, this time period equals 3 bits of data.

As long as the counter 42 counts down, the multiplexer control signal 40 switches a logical 0 to the output of the multiplexer 38 so that the control signal IDLE 18 remains logical 0 for the predefined time period of the data bits of a serial transmission. During this time period, the transmit and receive clock generation circuit 32 generates sampling pulses at times t5, t7, t8, and t9 of the receive clock signal CLK_RX. With the sampling pulses, the received serial data is sampled at the times t5, t7, t8, and t9.

At time t9, the count of the counter 42 equals 0 and, thus, the multiplexer 38 switches the received serial data RX on its output so that the control signal IDLE 18 is the received serial data RX. Since the received serial data is logical 1 when no serial data are transmitted according to the RS232 standard, also the control signal IDLE 18 is switched back from a logical 0 to a logical 1. This causes the local clock generation circuit 12 again to generate a clock signal CLK 16 with a duty cycle of about 50%, refer to time t10. Since the control signal IDLE 18 is logical 1, the transmit and receive clock generation circuit 32 again outputs a logical 0 as the receive clock signal CLK_RX 20 as derivation from the clock signal CLK 16.

Between time t11 and t12, the received serial data signal RX comprises interference pulses which also occur in the control signal IDLE 18. However, these interference pulses are shorter than half of a period and, thus, are not interpreted by the devices A 12 and B 14 as start bits of a serial data transmission. At time t13, a negative edge of the control signal IDLE 18 occurs and the control signal IDLE 18 remains logical 0 for the certain time period required to cause the clock generation device 12 to interpret the control signal IDLE 18 as a start bit for receiving serial data and to generate again a negative edge in the clock signal CLK 16 at time t14 (assuming that the clock signal CLK 16 is at time t14 logical 1). This negative edge triggers the transmit and receive clock generation circuit 32 to generate a sampling pulse of the receive clock signal CLK_RX for sampling the received serial data RX. Also at the same time, the transmit and receive clock generation circuit 32 starts the counter 42 (see FIG. 2) to count down for the time period of the predefined data bits of a serial transmission in order to sample the predefined number of bits from the received serial data RX.

According to the invention, device B 14 only consumes power when data are received or sent and data must be processed. Device B 14 processes data, which are transmitted to device C 22 or received from this device, by itself. It is also possible that device B 14 controls device A 12 via more complex signals, such as via a predefined control protocol or even via commands. The commands may be transmitted serially from device B 14 to device A 12 or also in parallel which requires more than a single control connection line.

The invention claimed is:

1. A serial data communication system comprising:
   a local clock generation device adapted for generating a clock signal with a duty cycle depending on a control signal, and
   a serial data communication control device adapted for generating the control signal depending on the receipt of a serial data signal and for deriving a transmit and receive clock signal from the clock signal received from the local clock generation device.

2. The system of claim 1, wherein the local clock generation device is adapted to generate the clock signal with a predefined clock having a first duty cycle if the control signal comprises a first state and having a second duty cycle differing from the first duty cycle if the control signal comprises a second state.

3. The system of claim 1, wherein the serial data communication control device is adapted to generate a pulse of the receive clock signal triggered by the negative edge of a pulse of the clock signal when the control signal comprises a respective state.

4. The system according to claim 1, wherein it is adapted to transmit and receive data serially according to the RS232 standard.

5. The system of claim 1, wherein the local clock generation device includes:
   an oscillator for generating a local high frequency clock signal, and
   a clock generation circuit adapted for generating a clock signal from the local high frequency clock signal with a duty cycle depending on a control signal.

6. A serial data communication system comprising
   a local clock generation device adapted for generating a clock signal with a duty cycle depending on a control signal,
   a serial data communication control device adapted for generating the control signal depending on the receipt of a serial data signal and for deriving a transmit and receive clock signal from the clock signal received from the local clock generation device, and
   wherein the serial data communication control device is adapted to derive the transmit and receive clock signal from the clock signal received from the local clock generation device after the serial data signal was received for a predefined time.

7. A serial data communication control device comprising
   a transmit and receive clock generation circuit coupled to an input of the serial data communication control device and adapted to generate a control signal from a receive data signal, received at the input, for controlling the generation of a clock signal,
   data processing circuitry coupled to the input and configured and adapted to process data received from a serial data communication device, via the input, and data to be transmitted to a serial data communication device, and
   wherein the transmit and receive clock generation circuit comprises a control signal generation circuit with a multiplexer, which receives a receive data signal and a constant signal on its input side, and a multiplexer control circuitry comprising a counter and being adapted for switching either of the input signals of the multiplexer to the multiplexer output as the control signal depending on the count of the counter.

8. A serial data communication method, comprising:
   a local clock generation device generating a clock signal with a duty cycle depending on a control signal, and a serial data communication control device generating the control signal depending on the receipt of a serial data signal and deriving a transmit and receive clock signal from the clock signal received from the local clock generation device.

9. A serial data communication system, comprising:
a serial data communication control device configured and arranged to:
  receive and process data signals; and
  generate a control signal, for generating a local clock signal depending on the receipt of a serial data signal, from the data signals;
an oscillator configured and arranged to generate a first clock cycle that is independent from the data signals; and
a local clock generation circuit configured and arranged to adjust the duty cycle of the first clock signal clock signal according to the control signals generated from the data signals to generate the local clock signal.

10. A serial data communication system, comprising:
a serial data communication control device configured and arranged to:
  receive and process data signals; and
  generate a control signal, for generating a local clock signal, from the data signals;
an oscillator configured and arranged to generate an first clock cycle that is independent from the data signals;
a local clock generation circuit configured and arranged to adjust the duty cycle of the first clock signal clock signal according to the control signals generated from the data signals to generate the local clock signal; and
wherein the serial data communication control device includes:
a multiplexor configured and arranged to receive the data signals on a first input and a logical 0 on a second input, a signal output from an output of the multiplexor being the control signal; and
a multiplexor control circuit configured and arranged to:
  cause the second input of the multiplexor to be coupled to the output of the multiplexor in response to an accumulated number bits of the data signals being less than a predefined number of bits, the predefined number of bits being greater than 0; and
  cause the first input of the multiplexor to be coupled to the output of the multiplexor in response to the accumulated number of bits of the data signals being greater than or equal to the predefined number of bits.

* * * * *